US008033523B2

(12) United States Patent
King et al.

(10) Patent No.: US 8,033,523 B2
(45) Date of Patent: Oct. 11, 2011

(54) SYSTEMS AND METHODS FOR TWO STAGE FLUID PATH ATTACHMENT TO PRESSURIZED FLUID RESERVOIRS

(75) Inventors: Timothy J. King, Connersville, IN (US); Jonathan Clark Swift, Cambridgeshire (GB); Geoffrey Richard Keast, Cambs (GB)

(73) Assignee: The Gates Corporation, Denver, CO (US)

( * ) Notice: Subject to any disclaimer, the term of this patent is extended or adjusted under 35 U.S.C. 154(b) by 564 days.

(21) Appl. No.: 12/002,130

(22) Filed: Dec. 14, 2007

(65) Prior Publication Data

US 2008/0217570 A1 Sep. 11, 2008

Related U.S. Application Data

(60) Provisional application No. 60/874,849, filed on Dec. 14, 2006.

(51) Int. Cl.
*F16K 35/00* (2006.01)
(52) U.S. Cl. ............... 251/90; 251/95; 251/149.6
(58) Field of Classification Search .......... 251/90, 251/95, 111, 149, 149.1, 149.3, 149.4, 149.6, 251/144, 148
See application file for complete search history.

(56) References Cited

U.S. PATENT DOCUMENTS

| 2,898,130 A | * | 8/1959 | Hansen | 285/277 |
| 3,879,013 A | * | 4/1975 | Hajek, Jr. | 251/144 |
| 4,150,809 A | * | 4/1979 | Muller | 251/149.4 |
| 4,745,894 A | * | 5/1988 | Laipply et al. | 123/196 R |
| 5,806,832 A | * | 9/1998 | Larbuisson | 251/149.6 |
| 6,499,717 B1 | * | 12/2002 | Porter et al. | 251/142 |
| 6,604,760 B2 | * | 8/2003 | Cresswell et al. | 285/305 |
| 6,637,781 B1 | * | 10/2003 | Seymour, II | 285/305 |

FOREIGN PATENT DOCUMENTS

| EP | 1 321 241 A1 | 6/2003 |
| FR | 1 298 463 | 7/1962 |
| FR | 1 354 955 | 3/1964 |
| FR | 1 530 375 | 6/1968 |

OTHER PUBLICATIONS

International Preliminary Report on Patentability Dated Jun. 16, 2009, International Application No. PCT/US2007/025682.
Notification of Transmittal of the International Search Report and the Written Opinion of the International Searching Authority, or the Declaration Mailed May 13, 2008.

* cited by examiner

*Primary Examiner* — John Fristoe, Jr.
(74) *Attorney, Agent, or Firm* — T. A. Dougherty, Esq.; J. A. Thurnau, Esq.; P. N. Dunlap, Esq.

(57) ABSTRACT

A connector includes a housing disposed in conjunction with a pressurized vessel and sprung valve assembly and a stem to be inserted into the housing in two stages. The stem is retained in the housing in the first stage and the stem activates the valve to release the pressurized fluid in the second stage. The connector employs a two-stage retaining mechanism that includes a clip retained in a groove defined in an interior wall of the housing, a lower groove and an upper groove formed into an exterior of the stem. The clip is disposed in the lower groove and the housing groove in the first stage; and in the upper groove and the housing groove in the second stage. The stem defines a stem stop that contacts an assembly setting mechanism upon completion of the first stage. The assembly setting mechanism is removed to allow the second stage.

12 Claims, 4 Drawing Sheets

SYSTEMS AND METHODS FOR TWO STAGE FLUID PATH ATTACHMENT TO PRESSURIZED FLUID RESERVOIRS

CROSS REFERENCE TO RELATED APPLICATION

This application claims the benefit of U.S. Provisional Application No. 60/874,849, also entitled Systems and Methods for Two Stage Fluid Path Attachment to Pressurized Fluid Reservoirs, filed Dec. 14, 2006, which is also incorporated herein by reference.

BACKGROUND OF THE INVENTION

1. Field of the Invention

This invention relates generally to fluid couplings, and more specifically to couplings that facilitate easy and safe connection of fluid flow paths to pressurized fluid reservoirs and activating a release valve to facilitate the release and/or passage of the pressurized fluid.

2. Description of the Prior Art

Typically more or less convention threaded fittings or single stage quick connect couplings have been employed to connect hoses, tubes or pipes to pressurized vessels, such as fire suppression tanks of the like. Developments in fire suppression systems, and similar fluid delivery systems, dictate that connections to high pressure fluid reservoirs be safe and dependable, while also being rapidly activated. Fluid connection fittings should sufficiently address a number of key functions including: leak free operation; being inherently safe to assemble; creating a reliable and efficient fluid path when assembled; not disengaging when subjected to a sudden pulse of pressure during connection; and/or being cost effective for installation in a manufacturing environment.

SUMMARY

The present invention is directed to connectors, systems and methods which provide easy and safe connection of delivery paths to pressurized fluid reservoirs, while preferably providing activation of a release valve, or the like, to facilitate the release and/or passage of the pressurized fluid. Fluid connectors employed in the present systems and implementing the present methods address a number of key functions desirable in fire suppression systems or similar fluid delivery systems. For example, connections to high pressure fluid reservoirs provided by the present connectors are safe, dependable, can be rapidly activated, are leak free, are inherently safe to assemble, create a reliable and efficient fluid path when assembled, do not disengage when subjected to a sudden pulse of pressure, and their installation is cost effective in a manufacturing environment. Hence, the present invention provides quick connect installation features with built-in safety and fluid path generation features.

Embodiments of a valve lock fluid connector employed in the present invention might include a housing disposed in conjunction with a pressurized vessel and a sprung valve assembly that is adapted to selectively allow release of a pressurized fluid in the vessel. Embodiments of the connector also include a stem adapted to be inserted in the housing in two stages. Preferably, the stem is securely retained in the housing in the first stage and the stem activates the valve to release the pressurized fluid through the stem in the second stage. This stem may have a bottom face adapted to open the valve, by bearing on and displacing a valve sealing membrane during the second stage. The stem might also have fluid flow orifices, which allow fluid released by the valve to enter into a main stem passage. One or more seals are preferably disposed on the stem to seal against an inner wall of the housing.

Embodiments of the connector also preferably employ a two-stage retaining mechanism. This two-stage retaining mechanism might include a clip retained in a groove defined in an interior wall of the housing, a lower groove formed into an exterior of the stem, and an upper groove formed into an exterior of the stem. In accordance with such embodiments of the present invention the clip is disposed in the lower groove and the housing groove upon completion of the first stage; and the clip is disposed in the upper groove and the housing groove upon completion of the second stage. These embodiments may also include a first frustoconical ramp to direct movement of the clip into the lower groove of the stem during a first stage insertion and a second frustoconical ramp to direct movement of the clip from the lower stem groove to the upper stem groove during the second stage insertion. Certain embodiments might only include one frustoconical ramp. In accordance with various ones of these embodiments, a depth of the upper stem groove is greater than a radius of the clip, whereby the clip is trapped in the upper stem groove during the second stage and the stem is locked in place in the housing. Also, the unrestrained inside diameter of the clip is preferably less than the minimum diameter of the upper and lower grooves in such embodiments.

According to various embodiments the stem defines a stem stop. In such embodiments the stem stop may contact an assembly setting mechanism, or the like, upon completion of the first stage. This assembly setting mechanism may be removed to allow the second stage.

In various embodiments the sprung valve assembly might be a multi-stage sprung valve, wherein the multi-stage sprung valve initially releases pressure from the pressurized vessel during an initial portion of the second stage to reduce insertion forces required to complete the second stage.

Also, various embodiments might employ a threaded adapter mechanism, which may be deployed in conjunction with the stem and adapted to be treaded onto threads defined by the housing. in such embodiments stage one may be carried out by screwing the threaded mechanism down into contact with an assembly setting mechanism. Then, the second stage may be initiated by removing the setting mechanism, and the second stage carried out by screwing the threaded mechanism further down to initiate activation of the sprung valve assembly.

In an embodiment of a method of the present invention the stem is pushed a first stage into the housing, the first stage deploying the clip disposed in the groove defined in an inner wall of the housing into the lower groove defined by the stem, thereby holding the stem in place without activating the valve to release the pressurized fluid. Then the stem is displaced a second stage, further into the housing, to engage and open the valve, and to move the clip from the lower stem groove into the upper stem groove. The clip moving into the upper groove preferably locks the stem in the housing.

In accordance with embodiments of such a method the first stage continues until a stem stop defined by the stem contacts an assembly setting mechanism and the setting mechanism is removed between the first stage and the second stage.

Alternatively, the second stage comprises threading the stem onto, or into, the housing, similar to as discussed above. In particular, other embodiments of a method of the present invention might include threading a threaded adapter onto the housing until the adapter contacts an assembly setting mechanism, and pushing the stem the first stage into the adapter a first stage. This deploys the clip disposed in a groove defined in an inner wall of the adapter into a groove defined by the stem, thereby holding the stem in place in the adapter without activating the valve to release the pressurized fluid. The second stage my be initiated by removing the setting mechanism and screwing the adapter further onto the housing, displacing the stem the a second stage, further into the housing, to engage and open the valve.

Advantageously, the present invention provides quick and easy assembly of a fluid path to a pre-pressurized fluid reservoir during pre-assembly. More particularly, the present invention provides safe first stage assembly ensuring that the connector assembly is held in an intermediate position before completing the connection with the fluid reservoir during a second stage of assembly.

As a further advantage the present invention provides a clearly visible indication that the valve is ready for second stage assembly, which may commence upon removal of the assembly setting mechanism.

Another advantage of the present invention is implementation of a two stage locking mechanism, which ensures that during second stage assembly there is no chance of the coupling becoming released and fluid being lost. Particularly, the present connector is securely held in position until second stage assembly is initiated. Conversely, typical single stage attachment systems expose assembly operators to a risk of blow-out and physical harm.

Advantageously, once assembled, the present valve lock fluid connector is locked in place, to at least some degree, permanently in place.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
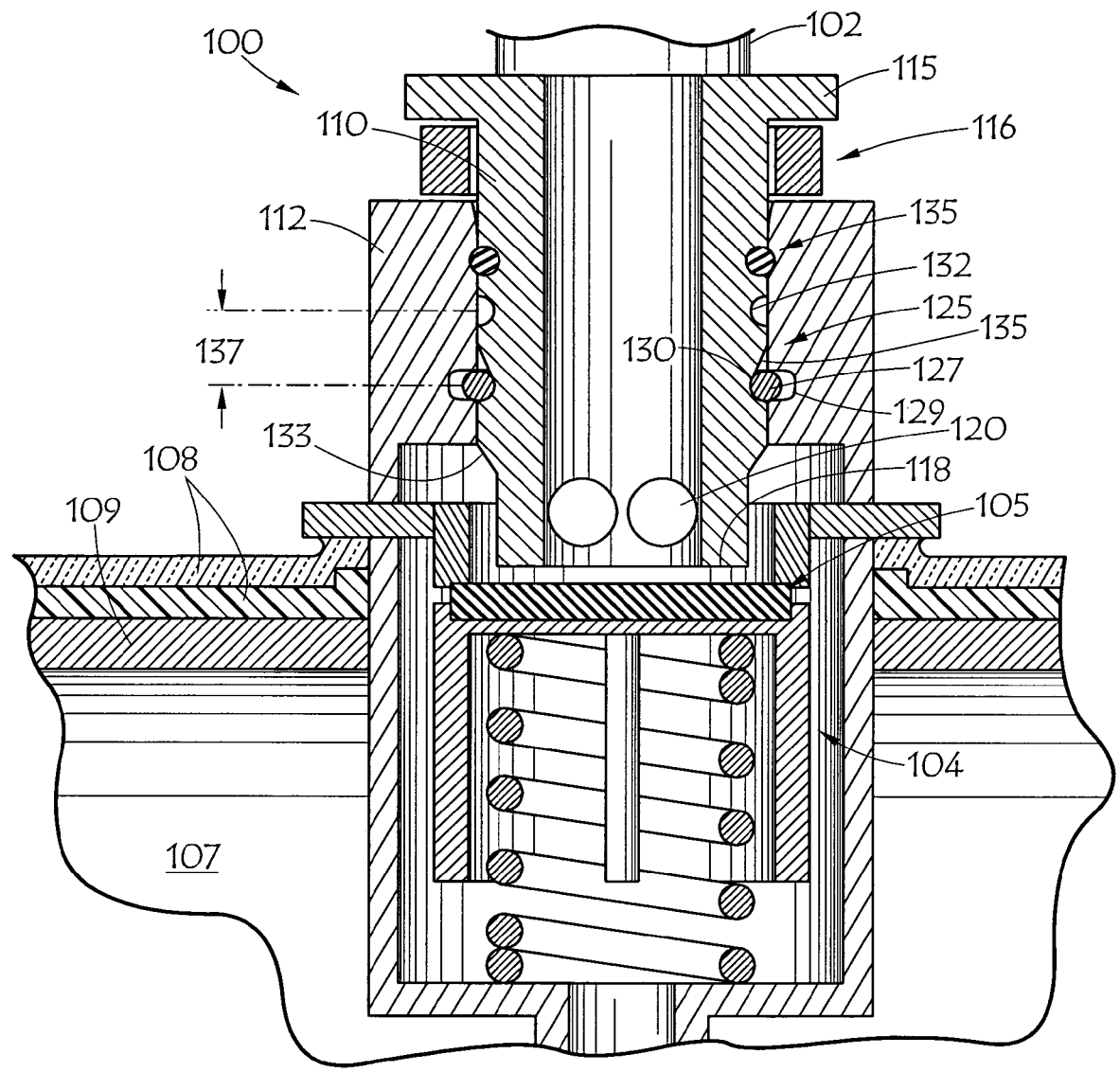
FIG. 1 is a diagrammatic, generally cross-sectional, fragmented view of an embodiment of the present valve lock fluid connector deployed in conjunction with a spring valve assembly and disposed at a first stage of deployment.
Figure 2:
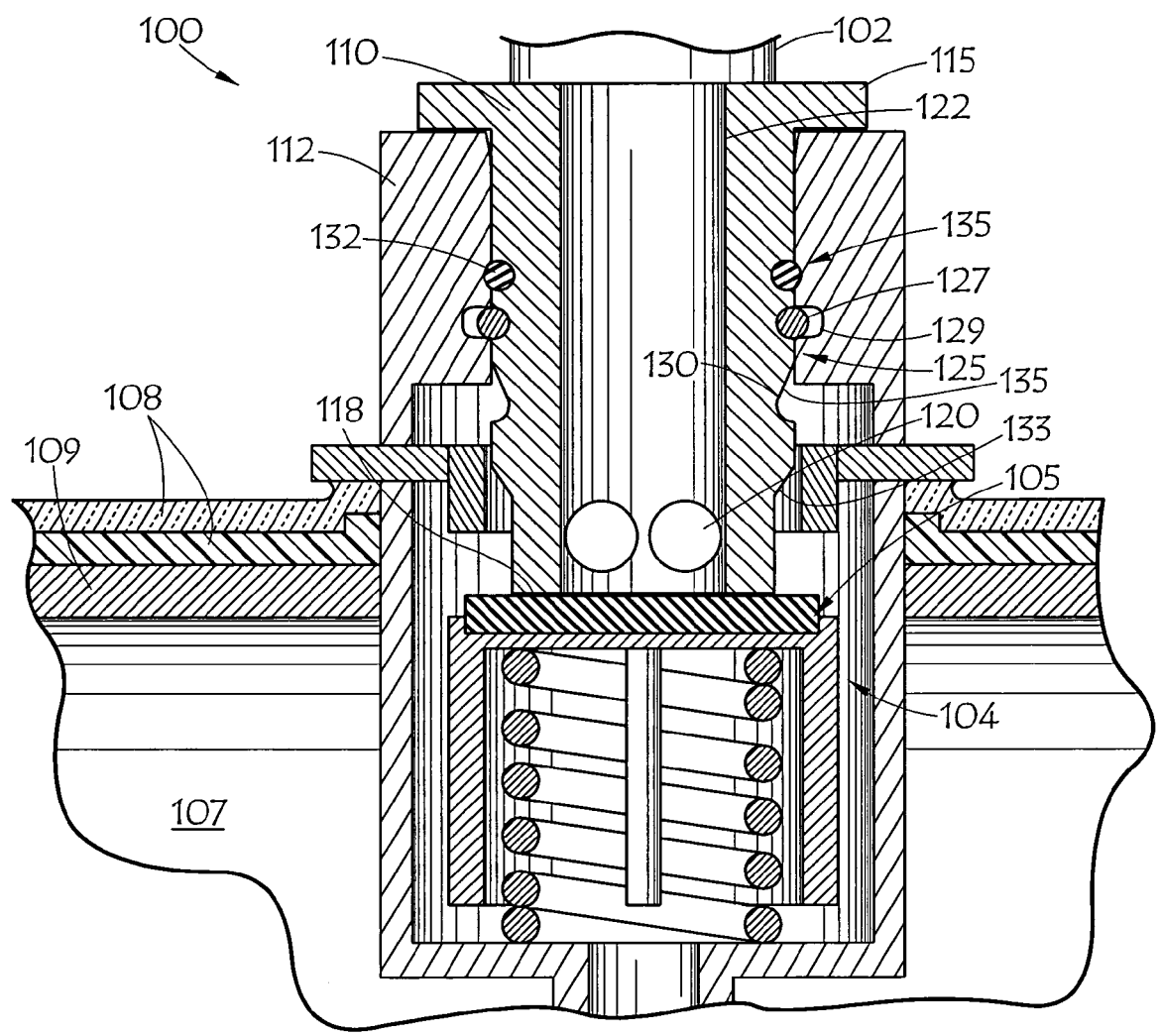
FIG. 2 is a diagrammatic, generally cross-sectional, fragmented view of the embodiment of the present valve lock fluid connector depicted in FIG. 1 disposed in a second, final stage of deployment.

Turning to FIGS. 1 and 2, present connector system embodiment 100 is connected to fluid transfer pipe 102 or similar fluid path. Valve lock fluid connector system 100 functions by displacing a spring valve assembly 104 which contains a seal 105. This seal may be of the membrane type or seated valve type or similar. Sprung valve assembly 104 is preferably connected to a pre-pressurized cylinder 107, such as a fire suppression tank, charged gas cylinder, pressurized fluid reservoir, or the like. The outer wall of cylinder 107 may comprise multiple layers 108 as illustrated. These layers may include a fiberglass wrap layer, sheet molded composite layer, and/or the like. Metal flange 109 may also be provided in the area that sprung valve assembly 104 is connected to tank 107.

Connector system 100 preferably comprises stem 110, housing 112, and sprung valve assembly 104. In accordance with embodiments of the present invention, assembly of system 100 preferably proceeds in two stages. Stage one, generally depicted as completed in FIG. 1, ensures initial connection of the fluid path to the fluid reservoir without release of fluid and locks the assembly against unintentional and dangerous release of fluid. Preferably, stop 115 and associated setting mechanism 116, or a similar mechanism, prevents further insertion of stem 110 into housing 112, which would displace valve sealing membrane 105 and cause unexpected and dangerous release of pressurized fluid. The assembly setting mechanism 11 may be removed (and discarded) allowing second stage connection to proceed. The second stage completes connection between the fluid path provided by fluid transfer pipe 102, or the like, and fluid reservoir 107, as shown in FIG. 2, and locks connector system 100 from release.

The illustrated embodiment of stem 110 includes bottom face 118, which is used to open valve 104, by bearing on and displacing seal 105 during second stage assembly. Stem 110 also preferably includes; fluid flow orifices 120, which allow fluid released by valve 104 to enter into main stem passage 122 and subsequently fluid path 102. Stem 110 and housing 112 together provide a two-stage retaining mechanism, generally indicated by reference number 125. Embodiments of two-stage retaining mechanism 125 might comprise clip 127, which is retained in groove 129, the depth of which is equal to or greater than the cross sectional diameter of the clip, and which may be defined in an interior wall of housing 112, and two grooves, 130 and 132, formed into an exterior of stem 110. Preferably, the inside diameter of clip 127 is less than the diameter of grooves 130 and 132 to ensure retention of the clip onto the assembled stem 110. Additionally, leak free fluid seal 135, such as one or more O-rings, seal packs or the like may be disposed on stem 110 to seal against the inner wall of housing 112.

The embodiment of present valve lock fluid connector system stem 110 illustrated in FIGS. 1 and 2 is connected to valve 104 by pushing the assembled stem 110 into the housing 112 until stem stop 115 contacts assembly setting mechanism 116. This ensures that clip 127 is disposed in the lower, or first of the two, stem grooves, groove 130. This holds the stem in place without activating valve 104 or releasing the pressurized fluid in tank 107. To prepare the connector for assembly step two, setting mechanism 116 is removed or released. During assembly step two, stem 110 is pushed down further. Depending on the size of the valve lock fluid connector and/or the pressure of the fluid in the tank, some form of external tool may be used to overcome the initial force of moving pressure energized sealing membrane seal 105. For example, this further insertion of the stem may be accomplished through the use of a lever, threads, or the like. Preferably, when the stem is displaced far enough into housing 112 and valve 104 to open the valve sealing membrane seal 105, (i.e. activation displacement distance 137) clip 127 moves from lower stem groove 130 into upper stem groove 132.

As shown in FIGS. 1 and 2, one or more frustoconical ramps (133 and 135), or a similar structure, which may be defined in the stem or housing wall, may facilitate deployment of stem 110. These embodiments may include first frustoconical ramp 133 to direct movement of clip 127 into lower groove 130 of stem 110 during first stage insertion and/or second frustoconical ramp 135 to direct movement of clip 127 from lower stem groove 130 to upper stem groove 132 during the second stage insertion. Certain embodiments might include only one frustoconical ramp. Preferably, the depth of upper stem groove 132 is greater than the radius of clip 127. Thus, once the clip is trapped in the upper stem groove 132 the valve lock fluid connector system is more-or-less permanently locked in place. Alternatively, a mechanism may be provided to allow release of stem 110, such as a slideable sleeve disposed around stem 110, which is adapted to capture the clip, under the sleeve and, in groove 132 to facilitate removal of stem 110 from housing 112.

In accordance with various embodiments of the present invention, stem 110 and/or housing 112 may be combined with (or comprise elements of) the fluid transfer pipe 102 and/or the valve components 104.

Figure 3:
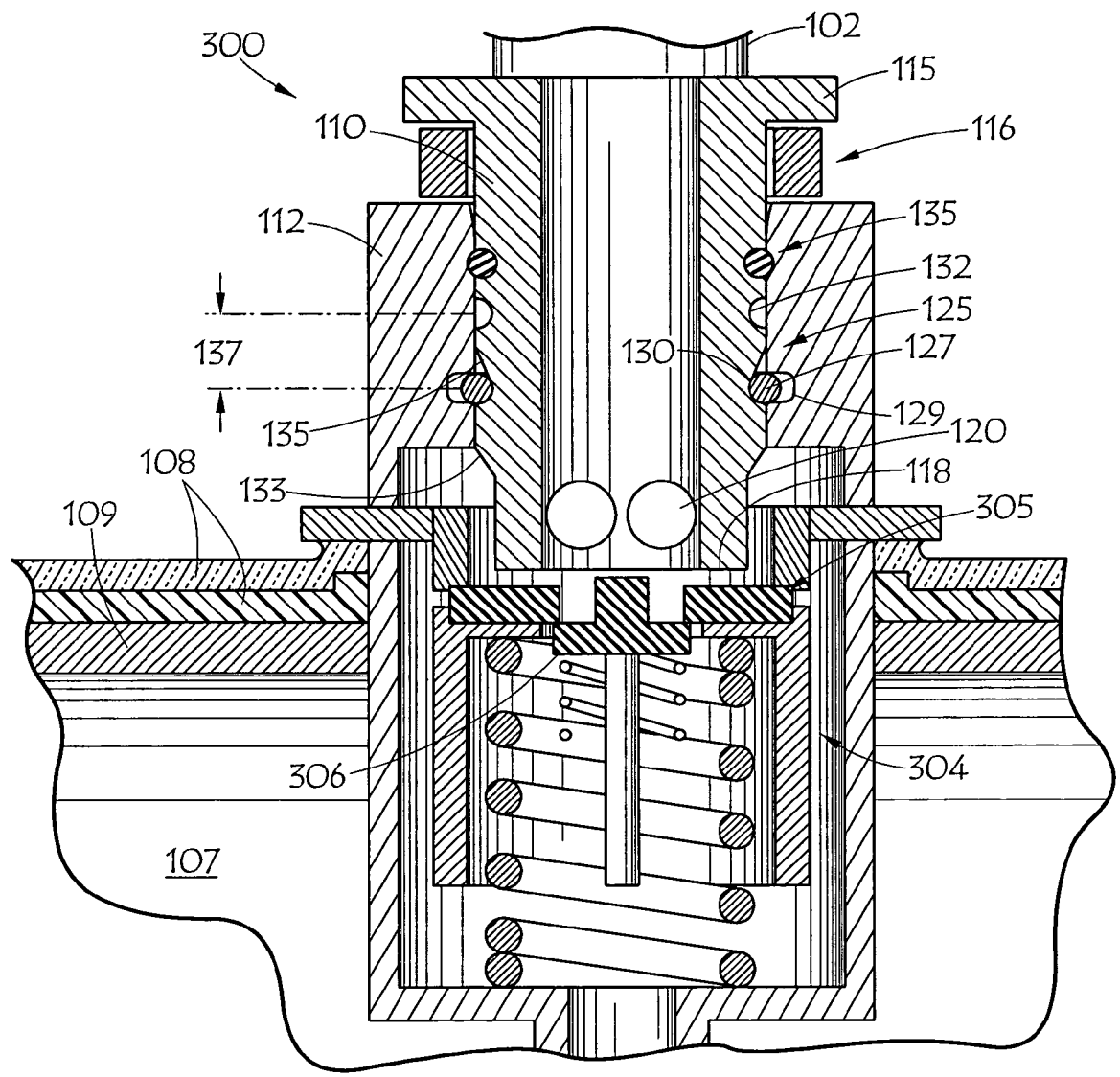
FIG. 3 is a diagrammatic, generally cross-sectional, fragmented view of another embodiment of the present valve lock fluid connector deployed in conjunction with a multistage spring valve assembly.

FIG. 3 depicts alternative embodiment 300 of the present invention which employs a multi-stage sprung valve 304. Multi-stage valve 304 has seal 305, which generally corresponds to seal 105 of FIGS. 1 and 2. However, valve 304 also employs an initial pressure release seal or membrane 306. During an initial portion of stage two, initial pressure release membrane 306 is engaged by stem bottom face 118. As a result, initial pressure release membrane 306 is deflected with relatively low force and initial release of fluid pressure is commenced. This equalizes pressure, to at least a certain degree, on either side of main seal 305. As a result, the force required to effect stage two insertion is significantly reduced, facilitating activation of seal 305 by further insertion of stem 110 into housing 112 and stem bottom face 118 contacting seal 305.

Figure 4:
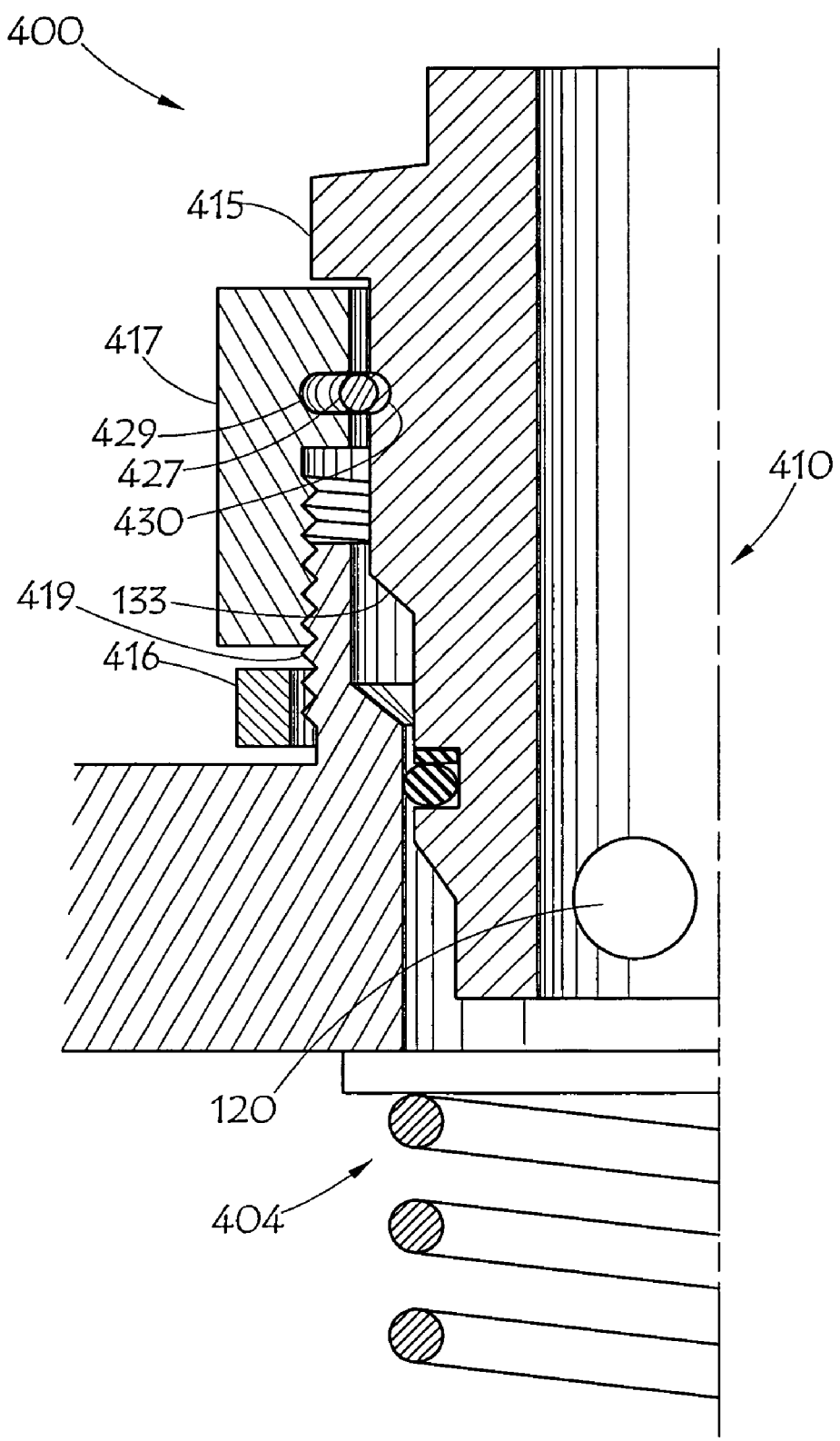
FIG. 4 is a diagrammatic, generally cross-sectional, fragmented view of an embodiment of the present valve lock fluid connector that employs a threaded mechanism for moving the stem through the second stage.

As depicted in FIG. 4 alternative embodiment 400 of the present invention might employ threaded adapter mechanism 417, adapted to be deployed in conjunction with stop 415 and assembly setting mechanism 416. In a preliminary assembly operation threaded mechanism 417 is threaded onto external threads 419 defined by the housing. Stage one may be carried out by inserting stem 410 into threaded mechanism 417 such that clip 427 located in groove 429 in the wall of the threaded assembly engages with groove 430 in the stem. Preferably, the inside diameter of clip 427 is less than the diameter of groove 430, and the depth of groove 430 is greater than half the diameter of clip 427 such that on completion of stage one insertion, the stem is locked into threaded mechanism 417. Then, stage two may be initiated by removing setting mechanism 416, and carried out by screwing threaded adapter mechanism 417 further down threads 419 to initiate activation of valve 404 by stem bottom face 418. In accordance with other alternative embodiments of the present invention, the assembly setting mechanism might take the form of a threaded shoulder, or the like, which might be defined by the stem. Whereby, the threaded shoulder still acts as a first stage stop, but provides sufficient force, when threaded into corresponding threads in the housing bore, to displace the valve sealing membrane during second stage screw insertion of the stem. Advantageously, the threaded components in these embodiments provides the necessary force to activate valve 404.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A valve lock fluid connector comprising:
   a housing disposed in conjunction with a pressurized vessel and a sprung valve assembly adapted to selectively allow release of a pressurized fluid in said vessel;
   a stem adapted to be inserted in said housing in two stages, said stem being securely retained in said housing in said first stage and said stem activating said valve to release said pressurized fluid through said stem in said second stage, wherein said stem defines a stem stop, wherein upon completion of said first stage said stem stop contacts an assembly setting mechanism; and
   a two-stage retaining mechanism comprising:
      a clip retained in a groove defined in an interior wall of said housing;
      a lower groove formed into an exterior of said stem; and
      an upper groove formed into an exterior of said stem.

2. The valve lock fluid connector of claim 1, wherein said stem comprises a bottom face adapted to open said valve, by bearing on and displacing a sealing valve during said second stage.

3. The valve lock fluid connector of claim 1, wherein said stem comprises fluid flow orifices, which allow fluid released by said valve to enter into a main stem passage.

4. The valve lock fluid connector of claim 1, wherein said clip is disposed in said lower groove and the housing groove upon completion of said first stage, and said clip is disposed in said upper groove and the housing groove upon completion of said second stage.

5. The valve lock fluid connector of claim 4, wherein said stem further comprises a frustoconical ramp to direct movement of said clip from said lower stem groove to said upper stem groove during said second stage insertion.

6. The valve lock fluid connector of claim 4, wherein said stem further comprises:

a first frustoconical ramp to direct movement of said clip into said lower stem grove during said first stage insertion; and a second frustoconical ramp to direct movement of said clip from said lower stem groove to said upper stem groove during said second stage insertion.

7. The valve lock fluid connector of claim 1, wherein a depth of said upper stem groove is greater than a radius of said clip, whereby said clip is trapped in said upper stem groove during said second stage and said stem is locked in place in said housing.

8. The valve lock fluid connector of claim 1, wherein the unrestrained inside diameter of said clip is less than the minimum diameter of said upper and lower grooves.

9. The valve lock fluid connector of claim 1, wherein said assembly setting mechanism is removed to allow said second stage.

10. The valve lock fluid connector of claim 1, wherein at least one seal is disposed on said stem to seal against an inner wall of said housing.

11. The valve lock fluid connector of claim 1, wherein said sprung valve assembly comprises a multi-stage sprung valve, wherein said multi-stage sprung valve initially releases pressure from said pressurized vessel during an initial portion of said second stage to reduce insertion forces required to complete said second stage.

12. A valve lock fluid connector comprising:

a housing disposed in conjunction with a pressurized vessel and a sprung valve assembly adapted to selectively allow release of a pressurized fluid in said vessel;

a stem adapted to be inserted in said housing in two stages, said stem being securely retained in said housing in said first stage and said stem activating said valve to release said pressurized fluid through said stem in said second stage; and a threaded mechanism deployed in conjunction with said stem and adapted to be treaded onto threads defined by said housing, said first stage carried out by insertion of said stem into said threaded mechanism, said second stage initiated by removing a setting mechanism, and said second stage carried out by screwing said threaded mechanism further down to initiate activation of said sprung valve assembly, wherein said stem defines a stem stop, wherein upon completion of said first stage said stem stop contacts an assembly setting mechanism.

* * * * *